United States Patent [19]

Britschgi et al.

[11] 4,417,982

[45] Nov. 29, 1983

[54] DEVICE FOR THE DEWATERING OF NATURALLY MOIST LUMP PEAT

[75] Inventors: Hugo Britschgi, Stalden; Bruno Portmann, Emmenbrücke; Louis Berchtold, Horw, all of Switzerland

[73] Assignee: Bell Maschinenfabrik Aktiengesellschaft, Kriens, Switzerland

[21] Appl. No.: 425,580

[22] Filed: Sep. 28, 1982

[30] Foreign Application Priority Data

Nov. 13, 1981 [CH] Switzerland .......................... 7301/81

[51] Int. Cl.³ .......................... B30B 9/24; B01D 33/14

[52] U.S. Cl. .......................... 210/386

[58] Field of Search .......................... 100/73, 74, 75, 72; 210/386, 350

[56] References Cited

U.S. PATENT DOCUMENTS

| | | | |
|---|---|---|---|
| 3,613,564 | 10/1971 | Wheeling et al. | 210/386 |
| 3,951,805 | 4/1976 | Dodd | 210/386 |
| 3,979,296 | 9/1976 | Basteen | 210/386 |

*Primary Examiner*—Frank Sever
*Attorney, Agent, or Firm*—Robert A. Ostmann

[57] ABSTRACT

In a device for the dewatering of naturally moist lump peat in natural obtained state and without flocculation agent through pressing, to obtain a natural composition, in terms of particles, of the dewatered product it is proposed that a system is integrated into the device, which has means (1,2,3,4,5) for the collection of the fluid pressed out via screens (31,32) and of the used water for the cleaning of the screens at their points of accumulation, for the static filtering (6,7) of the collected suspension, for the mixing together (30) of the fraction, separated there and condensed, with the fresh material which is to be treated and pressed by the device (34), for the guidance (11) of a portion of the filtrate separated there, essentially of a particle-free water, for the cleaning (12) of the screens (31,32) and for the removal (10) out of the device of a surplus portion of the separated filtrate exceeding the requirement of this cleaning.

6 Claims, 5 Drawing Figures

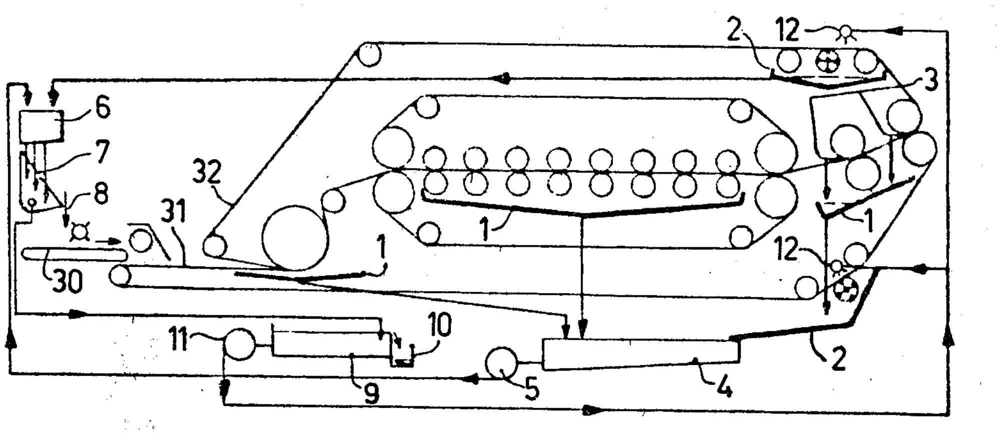
Fig. 1
Fig. 2
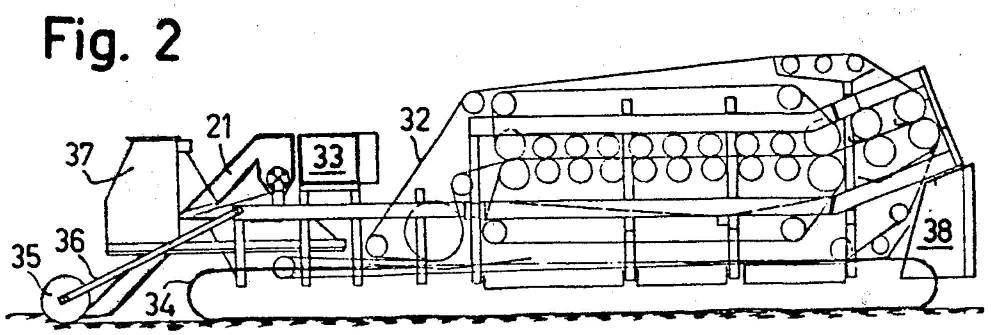
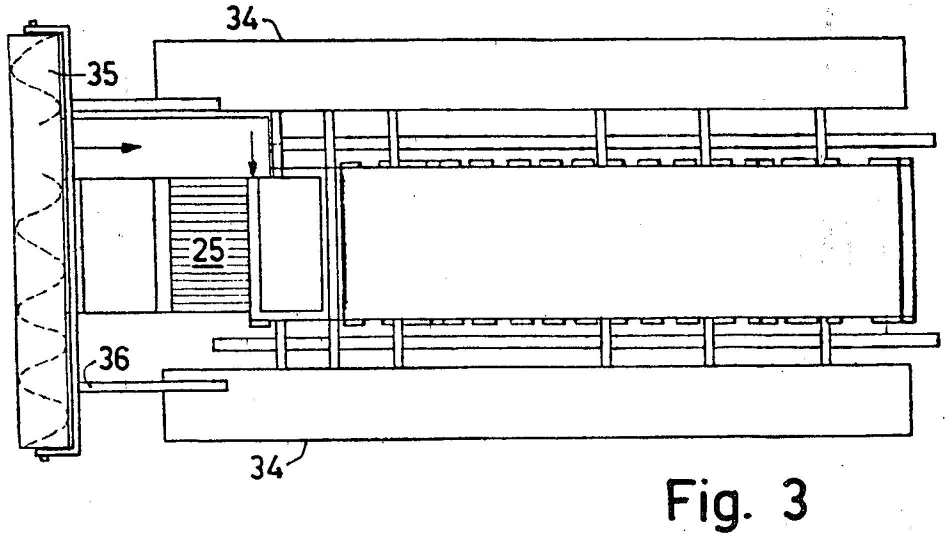
Fig. 3

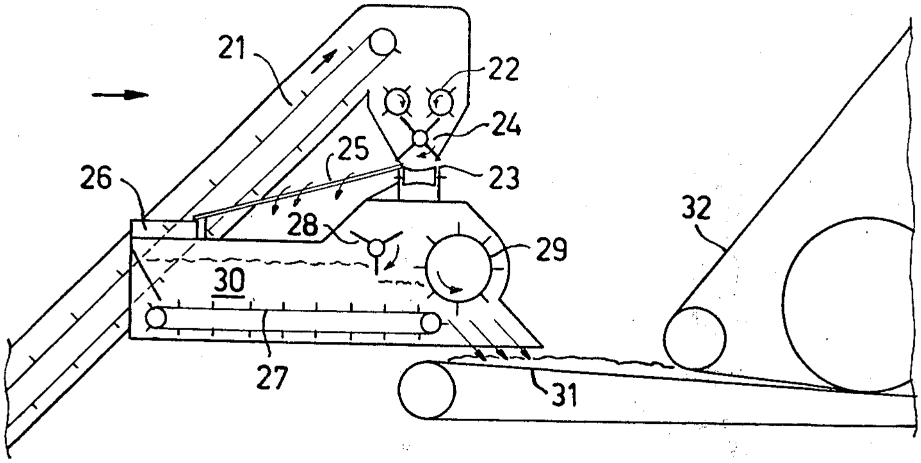
Fig. 4
Fig. 5
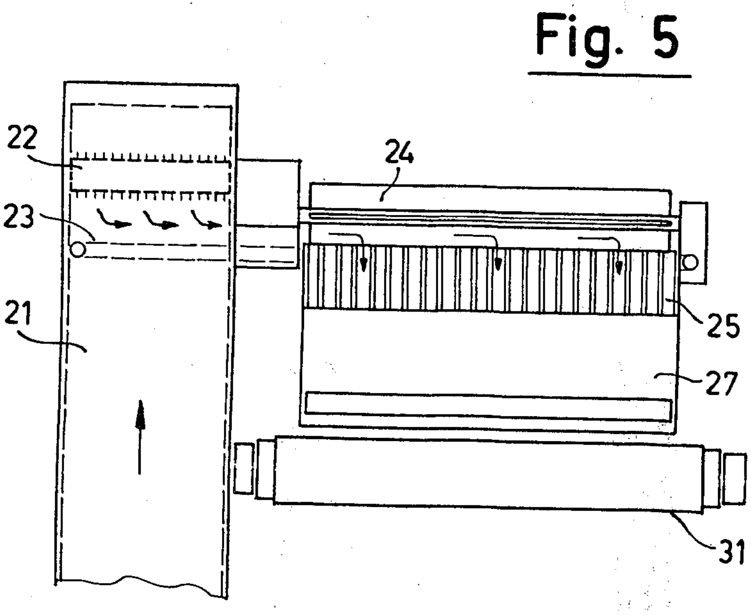

DEVICE FOR THE DEWATERING OF NATURALLY MOIST LUMP PEAT

BACKGROUND OF THE INVENTION

The invention relates to a device for the dewatering of naturally moist lump peat in its natural obtained state and without flocculation agent through pressing, which device has an inlet part for the material which is to be treated, means following on from this for the extrusion of a filtrate via screens and for the collection of the filtrate, and also washing devices for the repeated cleaning of the screens and for the collection of the used cleaning water, in particular a continuously operating machine wire press.

Such a machine wire press for the dewatering of lump peat is shown for example in the U.S. Pat. application Ser. No. 359,584, filed Mar. 18, 1982, now pending. The gathered lump peat, is very heterogeneous in terms of particles, ie. it has a very broad particle size spectrum, from fine fibres to coarse pieces. Before the dewatering, the natural peat is crushed, which additionally exposes the fine fractions. For reasons of economy it is necessary to use coarser meshed screens in the press in order to carry off considerable quantities of filtrate which are to be removed. This leads to considerable quantities of the finer fractions of the treated material being rinsed away. This means not only a loss of the matter, but also losses to quality, since the fine and finest fractions would be very desirable in the final product.

It is usual, today, to collect and eliminate the filtrate at the points it accumulates, just as the fluid used for the washing, rinsing of the filters, which also has a considerable proportion of fine fractions.

It had already been considered, to separate these suspensions and to add the particle slurry, gained principally through sedimentation, into the material which is to be processed. This present method leads, however, to the final product firstly having a variable proportion of the fine fractions through an intermittent input, and through a temporary delay components which are alien to each other come together. Particles are added to a peat harvested later, which originate from an earlier harvest or from another locality.

However, it is required of the final product that it has a quality totally corresponding to or the same as that harvested, as regards the composition both in terms of particle spectrum and also in terms of substance.

SUMMARY OF THE INVENTION

It is the object of the invention to achieve such a quality of the product, maintaining a high degree of profitability in the operation. For reasons of profitability, a device is also to be offered, which is able to be used directly, particularly in a peat bog.

This is achieved according to the invention, with a device of the type described in the introduction, in particular a peat press, in that the following means are provided, integrated with the device:

(a) ducts for the filtrate and for the used cleaning water which are connected at the appropriate accumulation points of the aforementioned (b) static filter for the filtering of the aforementioned, to which the ducts lead (c) means for the guidance of a fraction, separated at the filters and condensed, to the inlet section and means for the mixing of the fraction with the freshly added material to be treated (d) means for the guidance of a portion of the filtrate, separated at the filters, essentially of a water free from particles, to washing devices for the screens (e) means for the removal out of the device of a surplus portion, exceeding the requirement of the washing devices, of the filtrate separated at the filters.

Through these means it is achieved that the fine fraction, practically without loss of time, is added back to the material of the same quality after it has been rinsed out from the material through the screens. This also has a positive effect on the profitability of the operation, since with the aid of the fine fractions the mixture is able to be better stabilised and produces an elastic cake which holds together better, which can be treated at higher pressure, which leads to lower residual moisture of the final product. The resulting filtrate circuit guidance enables a more simple removal of the surplus filtrate and it is possible to improve on keeping the peat bog dry.

It is possible, according to one form of embodiment, to construct this compact device on a chassis and to move it as required in the peat bog. According to a further advantageous form of embodiment it is possible to connect the device to a harvesting machine for direct working in the peat bog.

BRIEF DESCRIPTION OF THE DRAWINGS

The invention will be described and explained in more detail below. The description relates to drawings, in which:

FIG. 1 shows a scheme of a device for the dewatering of lump peat.

FIG. 2 shows a device corresponding to that represented diagrammatically in FIG. 1, which is constructed on a chassis, from the side, partially in section.

FIG. 3 shows a plan view of the device in FIG. 2.

FIG. 4 shows a mixing device for slurry and fresh material from the side, partially in section.

FIG. 5 shows a view onto the mixing device in the direction of the arrow in FIG. 4.

DESCRIPTION OF THE PREFERRED EMBODIMENTS

The device represented diagrammatically in FIG. 1 is a machine wire press for the dewatering of lump peat harvested in a peat bog. It shows, on the left, an inlet section, via which the peat which is to be dewatered arrives onto a revolving lower screen 31, in order to be subsequently pressed and dewatered between the latter and a synchronized upper screen 32, under pressure which is exerted by press rolls. At the end of the press, on the right, the dewatered peat is obtained as the final product. In the extrusion of the water which is to be separated, a considerable proportion of fine fractions of the pressed peat is rinsed through the screens 31 and 32, another proportion remains adhering to the screens and is sprayed off with cleaning installations, spray pipes 12 from the screens 31 and 32 with cleaning water. This used cleaning water contains the proportion of the fine fractions of the peat remaining adhered to the screens after the pressing process. These two fine fractions of the peat which are referred to would therefore be missing in the final product, compared with the natural composition, as harvested. In order to avoid this, in each case at the relevant accumulation points of the filtrate water, ie. of the water which has pressed out via the screens 31 or 32, ducts are connected to collect the aforesaid, and similar ones at relevant accumulation points of the used spray water, i.e. the water which was used to clean the screens 31 and 32. These are collecting troughs 1 for the pressure water and collecting troughs 2 for the spray water. Also on the press rolls are wipers 3 to wipe off the pressure water from upper press rolls. The water collected in the collecting troughs 1 and 2 with the fine fractions floating with it, is brought together in a reservoir 4 and from here the aqueous suspension is conveyed via a low-pressure pump 5 to filters 6,7. The filters 6,7 are arranged at the input section, on the left. It is a filter device, known under the trade name *Kenfil, which has a distributor 6 and an inclined flat screen 7, or several arranged together, onto which the suspension flows. A condensed fraction, a dewatered slurry 8 remains above the screen and slips along the surface to the side and a filtrate percolates through. The separated fraction, the slurry, is passed to the freshly added lump peat which is to be processed, mixed together with this and this mixture arrives onto the lower screen 31 and is dewatered in the peat press, as described above. Essentially all previously rinsed out fine fractions are thus returned into the material and are to be found in the final product, the consistency of which, as regards particles and substance is equivalent to natural, harvested consistency, whereby the natural fibrous structure remains undamaged.

The filtrate separated through the filter screens, a water which is practically free of particles, is passed to a tank 9, for the purified water, for the filtrate. A part of the water is carried via a high-pressure pump 11 to the spray pipes 12 and is used to clean the screens 31 and 32, as described above.

A surplus part of the water accumulating in the pressing process, freed of fine fractions, is removed via an overflow and a duct 10 from the press and passed to a drainage system of the peat bog. All the means described are integrated with the actual machine wire press, ie. they are accommodated in the construction of the press and are connected and carried with it.

The filter devices 6 and 7 are integrated with means for the mixing of the slurry 8 accumulating on filtering with the freshly added material, the harvested lump peat, and are provided with these means at the input section, on the left, of the device, the peat machine wire press.

As can be seen in particular on an enlarged scale in FIG. 4 and 5, the harvested fresh material, the fresh lump peat, is carried from an elevator 21 to a pair of mandrel rolls 22. These disintegrate the coarse peat in reverse motion, and it then falls down onto a conveyor belt 23 and is driven on it sideways, distributed widthwise, in the region of a vane-roll 24. This vane-roll 24, like the subsequent devices, already has an approximate width of the screen 31. The vane-roll 24 throws the peat onto vibrating combs 25, where undesired coarse excess pieces, principally wood, are separated, and are thrown away via a trough 26. The material sieved through onto vibrating combs 25, disintegrated into pieces of usable size, falls into a mixing and distribution box 30, into which the slurry 8 from the filter 6,7 also arrives, which is suitably arranged above the vibrating comb 25 or above the box 30. This is not shown on FIGS. 4 and 5, for simplicity's sake, but is represented diagrammatically in FIG. 1.

A conveyor belt 27 is provided in the base of the mixing and distributing box to push the material in the direction of a dispersion roll 29 which scatters the material onto the lower screen 31. At the box 30 in front of the dispersion roll 29 an adjustment roll 28 is provided, which is rotatable against the conveying direction of the conveyor belt 27 and the dispersion roll 29. The adjustment roll 28 adjusts the desired height of the layer of material in front of the dispersion roll 29 and is also a mixing element to mix together the slurry 8 containing the returned fine fractions with the freshly added peat, by constantly throwing back a layer of the material moving towards it and thus shifting and thoroughly mixing the material. The mixture of fresh material and fine particle slurry arrives on the machine wire 31 into the press and is dewatered.

In FIGS. 2 and 3 the device, the lump peat press, is constructed on a chassis with caterpillar tracks 34. This enables a manoevering with the press directly in a peat bog. Advantageously, the device is connected with a harvesting machine 35, such as a cutter or excavator, which is controlled and driven via arms 36. For the supply of energy of the self-sufficient device a motor 33 is provided. The device is guided and operated from a cabin 37.

Also, an embodiment of the device with a separate harvesting machine, able to be operated separately, would be conceivable for special instances of usage in a peat bog.

The device is relatively simple and inexpensive in construction, and machine components, known per se from other fields of application and which are efficiently controllable were used. The energy consumption is justifiable relative to the high de-watering capacity. Also, furthermore, the method realised with the device is economical, since with the high degree of de-watering obtained, it is possible to manage without expensive agents supporting a de-watering, such as flocculation agents.

We claim:

1. A wire press machine comprising elements designed, arranged and dimensioned for dewatering moist lump peat in the naturally obtained state and without flocculation agents including an inlet section for fresh moist peat which leads that material to moving press screens between which the peat is squeezed to yield a filtrate; washing means for applying water to the screens to repeatedly clean them; duct means to collect the filtrate from the press screens and the used wash water; static filter means connected to receive the liquid collected by the duct means and to separate it into a peat fines fraction and an essentially particle-free water fraction; means for guiding the peat fines fraction to the inlet section and mixing it with the incoming fresh moist peat; means for leading a portion of the water fraction to the washing means; and means for discharging the remaining, surplus portion of the water fraction.

2. A machine as defined in claim 1 in which the static filter means is of open construction and includes an inclined screen.

3. A machine as defined in claim 1 in which the static filter means is aranged in the inlet section and is integrated with said guiding and mixing means.

4. A machine as defined in claim 3 in which the inlet section comprises an elevator for the incoming fresh moist peat; contra-rotating mandrel rolls arranged to receive moist peat discharged by the elevator and to disintegrate same; a first conveyor belt located below the mandrel rolls for receiving the disintegrated peat; a vane roll for removing disintegrated peat from the first conveyor belt; vibrating combs for sorting the disintegrated peat discharged by the vane roll and having a trough for collecting separated coarse pieces of peat; a box located beneath both the vibrating combs and the static filter means for receiving the sorted material which passes through the combs as well as the peat fines fraction from the filter means; a second conveyor belt in the base of the box; a dispersion roll at the discharge end of the second conveyor belt and rotatable in the conveying direction of that belt; and an adjustment roll located over the second conveyor belt ahead of the dispersion roll and rotatable in a direction opposite to the conveying direction of that belt.

5. A machine as defined in any one of claims 1–4 which is mounted on a chasis, whereby the machine components may be moved about as a unit.

6. A machine as defined in claim 5 which is connected with a peat-harvesting machine.

* * * * *